(12) United States Patent
Zhao et al.

(10) Patent No.: US 12,626,101 B2
(45) Date of Patent: May 12, 2026

(54) METHOD FOR CONSTRUCTING DESIGN CONCEPT GENERATION NETWORK (DCGN) AND METHOD FOR AUTOMATICALLY GENERATING CONCEPTUAL SCHEME

(71) Applicant: SICHUAN UNIVERSITY, Chengdu (CN)

(72) Inventors: Wu Zhao, Chengdu (CN); Miao Yu, Chengdu (CN); Xin Guo, Chengdu (CN); Kai Zhang, Chengdu (CN); Qian Zhao, Chengdu (CN); Hui Yu, Chengdu (CN); Jun Li, Chengdu (CN); Bing Lai, Chengdu (CN); Chong Jiang, Chengdu (CN); Yiwei Jiang, Chengdu (CN); Bo Wu, Chengdu (CN); Xingyu Chen, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 630 days.

(21) Appl. No.: 18/120,434

(22) Filed: Mar. 13, 2023

(65) Prior Publication Data

US 2024/0005130 A1     Jan. 4, 2024

Related U.S. Application Data

(63) Continuation of application No. PCT/CN2022/125347, filed on Oct. 14, 2022.

(30) Foreign Application Priority Data

Jul. 4, 2022     (CN) ......................... 202210780085.4

(51) Int. Cl.
*G06N 3/0455* (2023.01)
*G06F 17/16* (2006.01)
*G06N 3/08* (2023.01)

(52) U.S. Cl.
CPC ........... *G06N 3/0455* (2023.01); *G06F 17/16* (2013.01); *G06N 3/08* (2013.01)

(58) Field of Classification Search
CPC ...... G06N 3/0455; G06N 3/08; G06N 3/0475; G06F 17/16
See application file for complete search history.

(56) References Cited

U.S. PATENT DOCUMENTS

| | | | |
|---|---|---|---|
| 2019/0384810 A1 | 12/2019 | Huang et al. | |
| 2021/0334475 A1 | 10/2021 | He et al. | |

(Continued)

FOREIGN PATENT DOCUMENTS

| | | |
|---|---|---|
| CN | 107622047 A | 1/2018 |
| CN | 110390103 A | 10/2019 |

(Continued)

OTHER PUBLICATIONS

Vaswani, Ashish, et al. "Attention is all you need." Advances in neural information processing systems 30 (2017). (Year: 2017).*

(Continued)

*Primary Examiner* — Kevin W Figueroa
(74) *Attorney, Agent, or Firm* — Bayramoglu Law Offices LLC

(57) ABSTRACT

A method for constructing a design concept generation network (DCGN) and a method for automatically generating a conceptual scheme are provided. A DCGN includes a Transformer encoder, a Transformer decoder, an importance constraint matrix generation module, an importance constraint embedding layer, a cross-attention (CA) layer, and an optimization module. A word importance constraint is ingeniously introduced based on an attention mechanism of a Transformer to record input word constraint information contained in a generated text sequence. This can effectively ensure the reliability and effectiveness of a generated con- (Continued)

ceptual scheme and is conducive to capturing potential semantic importance information and implementing semantic knowledge reasoning.

14 Claims, 2 Drawing Sheets

(56) References Cited

U.S. PATENT DOCUMENTS

| 2021/0365635 A1 | 11/2021 | Olabiyi et al. |
| 2022/0180056 A1* | 6/2022 | Hong .................... G06N 3/0455 |

FOREIGN PATENT DOCUMENTS

| CN | 110442705 A | 11/2019 |
| CN | 110532328 A | 12/2019 |
| CN | 110619043 A | 12/2019 |
| CN | 112347242 A | 2/2021 |
| CN | 113128206 A | 7/2021 |
| CN | 114089834 A | 2/2022 |
| CN | 115169227 A | 10/2022 |
| WO | 2021208715 A1 | 10/2021 |

OTHER PUBLICATIONS

Al Amin, Akhter, et al. "Using BERT embeddings to model word importance in conversational transcripts for deaf and hard of hearing users." Proceedings of the Second Workshop on Language Technology for Equality, Diversity and Inclusion. 2022. (Year: 2022).*
Chai, Tianfeng, and Roland R. Draxler. "Root mean square error (RMSE) or mean absolute error (MAE)." Geoscientific model development discussions 7.1 (2014): 1525-1534. (Year: 2014).*
Colin Raffel, et al., Exploring the Limits of Transfer Learning with a Unified Text-to-Text Transformer, Journal of Machine Learning Research, 2020, pp. 1-67, vol. 21.
Zhang Min, et al., DAPC: Dual Attention and Pointer-Coverage Network Based Summarization Model, Computer Engineering and Applications, 2020, pp. 149-157, vol. 56, No. 8.
Zhang Peng-Fei, et al., Truncated Gaussian Distance-based Self-attention Mechanism for Natural Language Inference, Computer Science, 2020, pp. 178-183, vol. 47, No. 4.
Xu Xiaohong, et al., Research on data-to-text generation based on transformer model and deep neural network, Journal of Chongqing University, 2020, pp. 91-100, vol. 43, No. 7.
Han Shi, et al., SparseBERT: Rethinking the Importance Analysis in Self-attention, Proceedings of the 38th International Conference on Machine Learning, PMLR, 2021, vol. 139.
Colin Raffel, et al., Exploring the Limits of Transfer Learning with a Unified Text-to-Text Transformer, Journal of Machine Learning Research 21, 2020, pp. 1-67.

* cited by examiner

METHOD FOR CONSTRUCTING DESIGN CONCEPT GENERATION NETWORK (DCGN) AND METHOD FOR AUTOMATICALLY GENERATING CONCEPTUAL SCHEME

CROSS REFERENCE TO THE RELATED APPLICATIONS

This application is a continuation-in-part application of International Application No. PCT/CN2022/125347, filed on Oct. 14, 2022, which is based upon and claims priority to Chinese Patent Application No. 202210780085.4, filed on Jul. 4, 2022, the entire contents of which are incorporated herein by reference.

TECHNICAL FIELD

The present disclosure belongs to the technical field of product design, relates to the automatic generation of a conceptual scheme in product design, and particularly relates to the construction of a design concept generation network (DCGN) and automatic generation of a conceptual scheme based on the DCGN.

BACKGROUND

Innovative design is the basis of product development. As the core of innovative design, concept design determines most of the costs, quality, and performance during product development and is essential to product innovation. For example, in view of the problem of how to provide a usable water source for residents in coastal areas, a system for purifying seawater into drinking water or a design concept of using solar energy to desalinate seawater to produce canned drinking water or beverage products is proposed. As another example, when exploring a future public transportation system, a design concept of providing a personalized positioning seat service in the future public transportation system is put forward, which is beneficial for taking better care of vulnerable people. These design concepts provide designers or enterprises with design ideas in an early stage of product development and are more conducive to the generation of a product conceptual design scheme.

Prior design data is an important innovation source. As a core of innovative product concept design, conceptual scheme generation is a process of extracting valuable design knowledge from the prior design data and further transferring and reorganizing cross-field design knowledge to generate a creative conceptual scheme. With the advent of an era of big data and big knowledge, engineering data applied to concept design is increasing. This brings abundant innovation sources to the research of conceptual scheme generation. Fully applying the data to the conceptual scheme generation is beneficial to expanding design space and producing more design concepts. However, there are more severe challenges, mainly in two aspects. First, with the explosive growth of design data, the amount of knowledge applied to concept design is also gradually increasing. It is increasingly difficult to reason, transfer, and reorganize a large amount of design knowledge to produce creative conceptual schemes based on the manual experience and design heuristics of the designers. Second, design knowledge mainly comes from descriptions of existing product design schemes in different fields and is often complex and diverse with various knowledge types, such as functions, structures, scientific effects, cases, and others. In addition, an association relationship between knowledge is more complex and flexible. It is increasingly difficult to obtain valuable design knowledge based on design problems or design constraints and to combine multi-type cross-field design knowledge to generate new conceptual schemes.

As deep learning technology rapidly develops, many automatic generation technologies are developed and successfully complete various intelligent tasks, such as machine translation, image generation, speech recognition, and the like. The latest depth generation model has made important breakthroughs in many aspects of engineering design, such as structure optimization, material design, shape synthesis, and the like. There are also studies that use topology optimization and generative models, such as generative adversarial networks and the like, to automatically generate design concepts in the forms of images, spatial shapes, and the like. These design concepts are too abstract to understand or too detailed and not suitable for conceptual scheme design exploration in the early stage.

It is found through research that text is the most general and common form of describing design concepts and can cover rich and valuable design knowledge. How to learn potential combination rules of reasoning, transferring, and reorganizing design knowledge from massive cross-field text data through a simple and effective model and generating conceptual schemes suitable for the early stage is an important problem to be resolved in current product design.

SUMMARY

In view of current technical status of the lack of a method for automatically generating a conceptual scheme in the field of product design, an objective of the present disclosure is to provide a method for constructing a DCGN and a method for automatically generating a conceptual scheme through a DCGN. Reasoning, transfer, reorganization, and other potential rules of cross-field design knowledge can be adaptively learned from massive text data based on design problems, and conceptual schemes in a text form can be automatically generated. In this way, dependence on the manual experience of a designer is reduced, and design efficiency is improved.

An idea of the present disclosure is as follows: First, a DCGN is constructed. Then, the DCGN is trained. Finally, a design problem is inputted into a trained DCGN to automatically generate a conceptual scheme.

To achieve the foregoing objective, the present disclosure adopts the following technical solutions:

In a method for constructing a DCGN provided in the present disclosure, a word importance constraint is ingeniously introduced based on a self-attention mechanism of a Transformer network to construct a new generative network. A DCGN includes a Transformer encoder, a Transformer decoder, an importance constraint matrix generation module, an importance constraint embedding layer, a cross-attention (CA) layer, and an optimization module. In the present disclosure, training sample set data is used to train the DCGN. The training sample set data includes a plurality of samples. Each sample includes input words and a target sequence. The method for constructing a DCGN includes the following steps:

S1: obtaining, by the Transformer encoder, a feature of a hidden layer of the encoder based on input words in a sample;

S2: obtaining, by the Transformer decoder, a feature of a hidden layer of the decoder based on a target sequence in the sample;

S3: obtaining, by the importance constraint matrix generation module, an importance constraint matrix based on the input words and the target sequence in the sample;

S4: mapping, by the importance constraint embedding layer, the importance constraint matrix to a distributed vector space to obtain two input word importance embedding features;

S5: obtaining, by the CA layer, a generated sequence based on the feature of the hidden layer of the encoder, the feature of the hidden layer of the decoder, and the two input word importance embedding features; and S6: constructing a loss function based on the generated sequence and the target sequence, and adjusting, by the optimization module, network parameters based on the loss function; and repeating S1 to S6 until the loss function meets a specified requirement to obtain the DCGN.

In S1, the Transformer encoder maps discrete input words $x=\{x_1,x_2,\ldots,x_m\}\in \mathfrak{R}^{m\times n}$ (where m represents a number of input words in the current sample and n represents a dimension of an input word embedding vector) to a distributed feature representation through a self-attention layer to obtain the feature $h_e\in \mathfrak{R}^{m\times d}$ of the hidden layer of the encoder (where d represents a number of neurons of the hidden layer, where the number of neurons of the hidden layer of the Transformer encoder and that of the Transformer decoder are designed to be the same in the present disclosure).

$$h_e = SA\left(W_e^K x, W_e^V x, W_e^Q x\right) \tag{1}$$

where SA( ) represents spatial attention, $$W_e^K, W_e^V, \text{and } W_e^Q$$

represent weight matrices of the self-attention layer of the Transformer encoder, and x is discrete and unordered. Therefore, there is no need to incorporate position embedding in a figure when $h_e$ is calculated and the output $h_e$ does not contain any position information. A dimension m of the calculated vector $h_e$ is less than M, and a 0 vector is used for completion such that $h_e\in \mathfrak{R}^{m\times d}$ and M≥m>1 where M represents a maximum number of input words contained in an entire training sample set.

In S2, the Transformer decoder maps a target sequence $y_{:t-1}=[y_0,y_1,\ldots,y_{t-1}]$ at a moment t−1 to a distributed feature representation through a self-attention layer to obtain the feature $$h_d^t$$

of the hidden layer of the decoder.

$$h_d^t = SA\left(W_d^K y_{:t-1}, W_d^V y_{:t-1}, W_d^Q y_{:t-1}\right) \tag{2}$$

where SA( ) represents spatial attention;

$$W_d^K, W_d^V, \text{and } W_d^Q$$

4 represent weight matrices of the self-attention layer of the Transformer decoder; and $y_{:t-1}$ represents a target sequence at a moment t−1 during training.

An SA( ) function in formulas (1) and (2) may be calculated by using the following formula:

$$SA(K, V, Q) = \text{soft max}\left(\frac{QK^T}{\sqrt{d}}\right)V.$$

For the encoder, K is represented in $$W_e^K x, V$$

is represented in $$W_e^V x,$$

and Q is represented in $$W_e^Q x.$$

For the decoder, K is represented in $$W_d^K y_{:t-1}, V$$

is represented in $$W_d^V y_{:t-1},$$

and Q is represented in $$W_d^Q y_{:t-1}.$$

In S3, the importance constraint matrix in the present disclosure is represented by C, which is a result of input word information and target sequences $$\{y_{:t}\}_{t=0}^T$$

at different moments and can be expressed as follows:

$$C=F(x,\bar{w},y_0,y_{:1},y_{:2},\quad . \quad . \quad .\quad ,y_{:T})=[f(x,\bar{w},y_0);$$
$$f(x,\bar{w},y_{:1});\ldots;f(x,\bar{w},y_{:t});\ldots;f(x,\bar{w},y_{:T})] \tag{3},$$

where $y_0$ represents a given sequence at a start moment, which may be generated by using a special character, such as <EOS>; $f(x,\bar{w},y_{:t})$ represents an input word importance constraint vector $C_{:t}$ contained in the target sequence $y_{:t}$; $y_{:t}$ represents target sequences at moments before the moment t (including the moment t) in the sample; and T represents a length of the target sequence in the sample.

$f(x,\bar{w},y_{:t})$ is calculated as follows:

$$f(x,\bar{w},y_{:t})=\bar{w}\cdot c_t \tag{4}$$

5 where ·• represents a dot product operation of a vector or a matrix and $\overline{w}=[\overline{w}_1, \overline{w}_2, \ldots, \overline{w}_i, \ldots, \overline{w}_m] \in \mathfrak{R}^m$ represents a relative importance vector of the input words x in the target sequence $y_{:t}$ and is calculated as follows:

$$\overline{w}_i = \left[ \frac{w_i - w_{min}}{w_{max} - w_{min}} \times (M-1) \right], \forall i \in \{1, 2, \cdots, m\}, \quad (5)$$

where $\overline{w}_i$ represents the relative importance of an $i^{th}$ input word in the target sequence $y_{:t}$; $w_i$ represents the absolute importance of the $i^{th}$ input word in the target sequence $y_{:t}$; $w_{min}$ represents the minimum absolute importance of the input word in the target sequence $y_{:t}$; $w_{max}$ represents the maximum absolute importance of the input word in the target sequence $y_{:t}$; and [ ] represents a rounding operation.

The relative importance $\overline{w}_i \in \{0,1, \ldots, M-1\}$ obtained after the foregoing regularization process is an integer.

$c_i \in \mathfrak{R}^m$ represents an input word constraint contained in the target sequence $y_{:t}$. When the target sequence $y_{:t}$ contains the $i^{th}$ input word, an $i^{th}$ element in the vector $c_t$ is 1, and the vector is calculated as follows:

$$c_t = \left(c_t^i\right)_{i=1}^m = \begin{cases} c_t^i = 0, & \text{if } x_i \subset y_{:t} \\ c_t^i = 1, & \text{if } x_i \not\subset y_{:t} \end{cases}. \quad (6)$$

$f(x,\overline{w},y_{:t})$ calculated by using formula (3) is an integer vector of the relative importance.

In S4, two new importance constraint embedding matrices $$W_c^K \in \mathfrak{R}^{M \times d}$$

and $$W_c^V \in \mathfrak{R}^{M \times d}$$

are introduced in the present disclosure. The constructed importance constraint matrix C is mapped to the distributed vector space to obtain the two input word importance embedding features $$h_{:t}^K$$

and $$h_{:t}^V.$$

The features are as follows at a moment t during generation:

$$h_{:t}^K = W_c^K(C_{:t-1}) = W_c^K[f(x, \overline{w}, y_{:t-1})] \quad (7)$$

$$h_{:t}^V = W_c^V(C_{:t-1}) = W_c^V[f(x, \overline{w}, y_{:t-1})] \quad (8)$$

6

$t \in \{1, 2, \ldots, T\}$ In addition, in formulas (7) and (8), the importance constraint matrix $$W_c^K$$

and a corresponding row of $$W_c^V$$

are indexed based on the relative importance $f(x,\overline{w},y_{:t-1})$, and a default row is zeroed to obtain the features $$h_{:t}^K, h_{:t}^V \in \mathfrak{R}^{M \times t \times d}.$$

In S5, the CA layer fuses the feature $(h_e)$ of the hidden layer of the encoder, the feature $$\left(h_d^t\right)$$

of the hidden layer of the decoder, and the two input word importance embedding features (preferably, the two input word importance embedding features $$h_{:t}^K, h_{:t}^V$$

in the present disclosure) to obtain a generated sequence $$y_{:t}^o$$

at a moment t.

$$y_{:t}^o = CA\left(W_d^K h_e, W_d^V h_e, h_{:t}^K, h_{:t}^V, W_d^Q h_d^t\right), \quad (9)$$

where $$W_d^K, W_d^V, W_d^Q$$

represent weight matrices of a self-attention layer of the decoder.

In a specific implementation, a $j^{th}$ element in a CA function may be expressed as follows:

$$CA(q, k, h^k, h^v, v)_j = \sum_{i=0}^{M-1} \alpha_{ij}\left(v + h_{ij}^v\right), \quad (10)$$

where $q = W_d^K h_e; k = W_d^V h_e; v = W_d^Q h_d^t;$ 7                                                                  8

-continued $$\alpha_{ij} = \text{soft max}(e_{ij}) = \frac{\exp\,(e_{ij})}{\sum\limits_{l=0}^{d-1}\exp\,(e_{il})};$$

$$e_{ij} = \frac{q_j\big(k_i + h_{ij}^k\big)^T}{\sqrt{d}}; i = 0, 1, \ldots, M-1; j \text{ and } l = 0, 1, \ldots, d-1.$$

Over time, S2 to S5 are repeated. When t=T, the DCGN obtains a final generated text sequence $$y_{:T}^o.$$

For samples in the training sample set, S1 to S5 are repeated to obtain generated sequences corresponding to the samples.

In S6, for a given N samples $$\{x^{(n)}, y^{(n)}\}_{n=1}^N,$$

the loss function of the DCGN constructed based on the generated sequence and the target sequence is as follows:

$$\text{Loss}_{DCGN} = \frac{1}{TN}\sum_{n=1}^N\sum_{t=1}^T err(y_{:t}^o, y_{:t}), \quad (11)$$

where $$err(y_{:t}^o, y_{:t})$$

represents an error between a generated sequence $$y_{:t}^o$$

and a target sequence $y_{:t}$ at a moment t, and is usually calculated through cross-entropy.

The network parameters are adjusted and optimized based on the loss function by using an Adam optimization algorithm. Then, S1 to S6 are repeated until the loss function meets the specified requirement, for example, the loss function tends to be stable and basically unchanged, to complete the construction of the DCGN. The network parameters are mainly the weight matrices of the self-attention layer of the encoder that are used to obtain the feature of the hidden layer of the encoder, the weight matrices of the self-attention layer of the decoder that are used to obtain the feature of the hidden layer of the decoder, and the importance constraint embedding matrices. Initialization parameters of the importance constraint embedding matrices may be obtained through random initialization. Initialization parameters of the weight matrices of the self-attention layer of the encoder that are used to obtain the feature of the hidden layer of the encoder and the weight matrices of the self-attention layer of the decoder that are used to obtain the feature of the hidden layer of the decoder may be obtained through random initialization. In a preferred implementation, a common knowledge text database is used to train a conventional Transformer network (such as Text-to-Text Transfer Transformer (T5) or Generative Pre-trained Transformer (GPT)) to obtain the initialization parameters of the weight matrices of the self-attention layer of the encoder and the weight matrices of the self-attention layer of the decoder. In this way, the DCGN provided in the present disclosure can understand common knowledge, and fluency of a design concept generated by the DCGN is ensured. The DCGN is further trained by using the method provided in the present disclosure. The DCGN can perform intelligent reasoning on engineering design knowledge to ensure the reasonableness of the generated design concept.

The present disclosure further provides a method for automatically generating a conceptual scheme. A constructed DCGN is used to perform the following steps:

L1: obtaining, by a Transformer encoder, a feature of a hidden layer of the encoder based on input words;

L2: obtaining, by a Transformer decoder, a feature of a hidden layer of the decoder at a moment t based on a generated sequence at a moment t−1;

L3: obtaining, by an importance constraint matrix generation module, an importance constraint matrix based on the input words in a sample and the generated sequence at the moment t−1;

L4: mapping, by an importance constraint embedding layer, the importance constraint matrix to a distributed vector space to obtain two input word importance embedding features; and L5: obtaining, by a CA layer, a generated sequence based on the feature of the hidden layer of the encoder, the feature of the hidden layer of the decoder, and the two input word importance embedding features.

In L1, the input words may be keywords constructed based on a design problem, at least one design incentive, keywords constructed based on design requirements, or a combination of at least two of the foregoing input word sources.

In L2, the feature $$h_d^t$$

of the hidden layer of the decoder at the moment t is calculated based on the generated sequence at the moment t−1 by using the following formula:

$$h_d^t = SA\big(W_d^K y_{:t-1}, W_d^V y_{:t-1}, W_d^Q y_{:t-1}\big). \quad (12)$$

$y_{:t-1}$ represents an input sequence of the decoder at a moment t during generation, $$y_{:t-1} = [y_0^o, y_{:t-1}^o], y_0^o$$

represents a given sequence at a start moment and may be denoted by a special character such as <EOS>, and $$y_{:t-1}^o$$

represents the generated sequence at the moment t−1.

In L3, during the generation of a conceptual scheme, the constraint matrix is calculated based on a time step and an actual sequence generated at each moment.

The importance constraint matrix $C_{:,t-1}$ is calculated based on the input words in the sample and the generated sequence at the moment t−1 by using the following formula:

$$C_{:,t-1} = f(x, \overline{w}, y_{:,t-1}) \tag{13}.$$

x represents the input words. $y_{:,t-1}$ represents the input sequence of the decoder at the moment t during the generation. $\overline{w}=[\overline{w}_1, \overline{w}_2, \ldots, \overline{w}_i, \ldots, \overline{w}_m] \in \mathfrak{R}^m$ represents a relative importance vector of the input words x in the input sequence $y_{:,t-1}$ of the decoder and may be calculated by using formula (5). The absolute importance of the input words in the input sequence $y_{:,t-1}$ of the decoder may be preset based on the importance order of the input words or may be set to be the same.

In L4, the two input word importance embedding features $$h_{:,t}^K, h_{:,t}^V$$

are obtained. The two input word importance embedding features $$h_{:,t}^K, h_{:,t}^V$$

at the moment t are calculated by using formulas (7) and (8).

In L5, a generated sequence at the moment t is calculated by using formulas (9) and (10).

L1 to L5 are repeated until a length of the generated sequence meets a specified requirement or the end identifier <EOS> is generated to obtain a final generated sequence, namely, the conceptual scheme.

The present disclosure has the following beneficial effects over the prior art:

(1) The present disclosure ingeniously introduces a word importance constraint based on an attention mechanism of Transformer to construct a new DCGN.

(2) The importance constraint matrix proposed in the present disclosure records input word constraint information contained in a generated text sequence. The reliability and effectiveness of the generated conceptual scheme can be effectively ensured.

(3) The importance constraint embedding layer proposed in the present disclosure maps the constructed importance constraint matrix to the distributed vector space. Continuous real-number vectors are used to represent the relative importance of the input words in the generated sequence or the target sequence. This is conducive to capturing potential semantic importance information and implementing semantic knowledge reasoning.

(4) The CA layer constructed in the present disclosure maps the input word importance embedding features to the generated sequence to supervise the generation of a text sequence containing input word importance information.

DETAILED DESCRIPTION OF THE EMBODIMENTS

The technical solutions in the embodiments of the present disclosure are clearly and completely described below by referring to the accompanying drawings. The described embodiments are merely some, rather than all, of the embodiments of the present disclosure. All other embodiments obtained by a person of ordinary skill in the art based on the embodiments of the present disclosure without creative efforts shall fall within the present disclosure.

Embodiment 1

Figure 1:
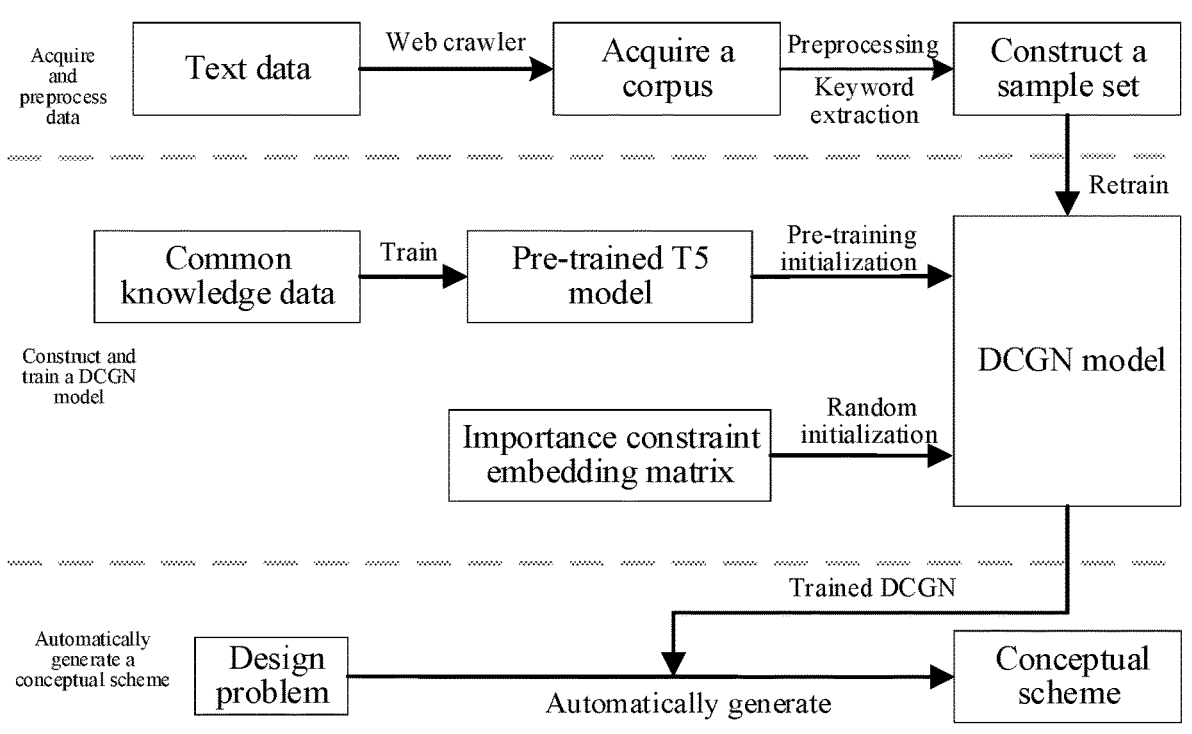
FIG. 1 is a schematic diagram of a framework for constructing and using a DCGN according to an embodiment of the present disclosure.

As shown in FIG. 1, text data is obtained through a web crawler technology and preprocessed. Subsequently, a DCGN model is constructed and trained. Finally, a conceptual scheme is automatically generated by inputting design keywords as input words into a trained DCGN model.

In this embodiment, a conventional web crawler technology is used to crawl massive text data, such as scientific papers and patents, from websites, and the acquired text data is filtered to obtain sentences with a specific length as a corpus for this study. Then, the text data is preprocessed, and a keyword extraction algorithm is used to extract a specific number of keywords (excluding stop words) and their importance from each sentence. Finally, each sentence and its corresponding keyword information are combined into a sample pair, and a sample set consisting of all sample pairs is constructed for subsequent network training. In each sample, the extracted keywords are used as an input sequence, and the corresponding sentence is used as a target sequence.

(I) Construction of a DCGN

In this embodiment, a word importance constraint is ingeniously introduced based on a self-attention mechanism of a Transformer network to construct a new generation network. A DCGN includes a Transformer encoder, a Transformer decoder, an importance constraint matrix generation module, an importance constraint embedding layer, a CA layer, and an optimization module. The Transformer encoder is configured to obtain a feature of a hidden layer of the encoder. The Transformer decoder is configured to obtain a feature of a hidden layer of the decoder. The importance constraint matrix generation module is configured to generate an importance constraint matrix. The importance constraint embedding layer is configured to map the importance constraint matrix to a distributed vector space to obtain two input word importance embedding features. The CA layer is configured to obtain a generated sequence. The optimization module is configured to optimize network parameters based on a loss function.

In a method for constructing a DCGN provided in this embodiment, the sample set is used for training to obtain weight matrices of a self-attention layer of the encoder that are used to obtain the feature of the hidden layer of the encoder, weight matrices of a self-attention layer of the decoder that are used to obtain the feature of the hidden layer of the decoder, and two importance constraint embedding matrices.

In this embodiment, a common knowledge text database (selected from Wikipedia) is used to train a conventional Transformer network (T5) to obtain initialization parameters of the weight matrices of the self-attention layer of the encoder that are used to obtain the feature of the hidden layer of the encoder and the weight matrices of the self-attention layer of the decoder that are used to obtain the feature of the hidden layer of the decoder. Initialization parameters of the two importance constraint embedding matrices are obtained through random initialization.

1. The T5 network is trained by using the common knowledge text database.

The T5 network is trained by using the common knowledge text database to obtain the weight matrices $$\left(W_e^K, W_e^V, \text{and } W_e^Q\right)$$

of the self-attention layer of the encoder and the weight matrices $$\left(W_d^K, W_d^V, \text{and } W_d^Q\right)$$

of the self-attention layer of the decoder. Interpretation of the encoder and the decoder is as described above. A specific process of training the T5 network can be found in literature, such as "Exploring the Limits of Transfer Learning with a Unified Text-to-Text Transformer (Colin Raffel et al, Journal of Machine Learning Research 21(2020)1-67)". The weight matrices $$\left(W_e^K, W_e^V, \text{and } W_e^Q\right)$$

of the self-attention layer of the encoder and the weight matrices $$\left(W_d^K, W_d^V, \text{and } W_d^Q\right)$$

of the self-attention layer of the decoder in a trained T5 network are used as initialization parameters of the DCGN in the present disclosure.

2. The DCGN is constructed.

Figure 2:
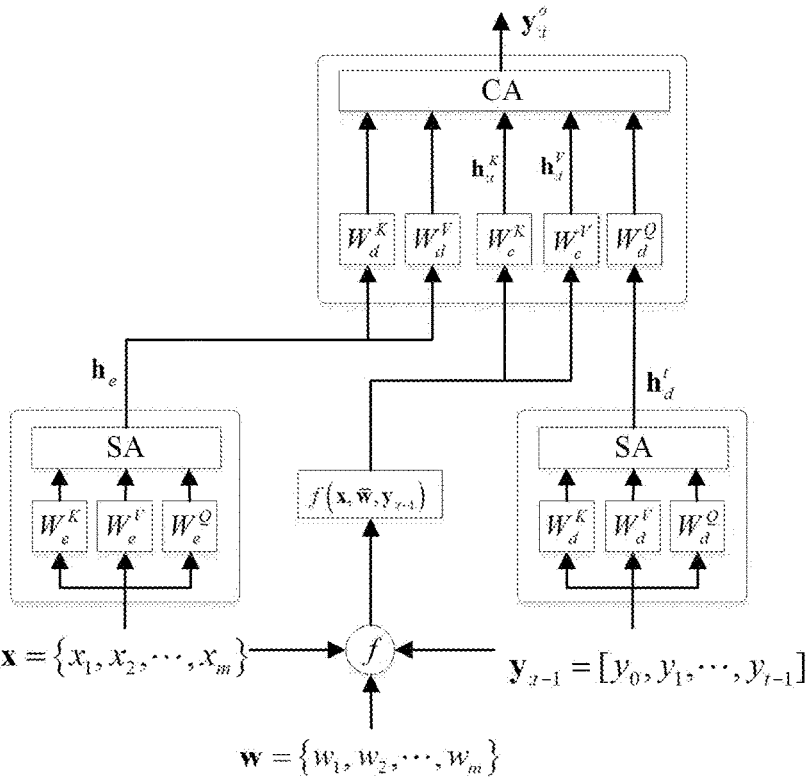
FIG. 2 is a schematic principle diagram of a method for constructing a DCGN according to an embodiment of the present disclosure.

As shown in FIG. 2, the method for constructing a DCGN provided in this embodiment includes the following steps:

S1: The feature of the hidden layer of the encoder is obtained by the Transformer encoder based on input words in a sample.

In this step, the feature $h_e$ of the hidden layer of the encoder is calculated based on the input words $x=\{x_1,x_2, \ldots , x_m\}$ in the sample by using formula (1).

S2: The feature of the hidden layer of the decoder is obtained by the Transformer decoder based on a target sequence in the sample.

In this step, a feature $$h_d^t$$

of the hidden layer of the decoder at a moment t is calculated based on the target sequence $y_{:t-1}=[y_0,y_1, \ldots , y_{t-1}]$ in the sample by using formula (2).

S3: The importance constraint matrix is obtained by the importance constraint matrix generation module based on the input words and the target sequence in the sample.

The importance constraint matrix C is determined by using formula (3).

An importance constraint matrix $C_{:t-1}=f(x,\overline{w},y_{:t-1})$ at a moment t−1 is calculated based on the input words and a target sequence $y_{:t-1}$ at the moment t−1 by using formulas (4) to (6).

The following uses a specific example to describe a detailed process of calculating C during training of the DCGN. It is assumed that the input of the DCGN is a set of three keywords {"sensor", "device", "sowing" }, and the generated target sequence is "a sensor device for determining a position of seeds while sowing." It is assumed that the importance of the input words in the target sequence is w=[0.9,0.7,0.5] and M=5. A relative importance vector $\overline{w}$=[4,2,0] may be calculated by using formula (4) and represents the relative importance of the three input words in the target sequence. The following describes a procedure for calculating C, as shown in Table 1.

(a) A target sequence at a moment when a start identifier <EOS> is generated does not contain any input word. Therefore, $c_0$ is an all-zero vector at this moment. $C_0=f(x,\overline{w},y_0)$ calculated by using formula (4) is also an all-zero vector, corresponding to values in the first column in Table 1.

(b) A second generated target word is "a", and a target sequence at this moment still does not contain any input word. Therefore, $c_1$ is an all-zero vector at this moment. $C_{:1}=f(x,\overline{w},y_{:1})$ calculated by using formula (4) is also an all-zero vector, corresponding to values in a second column in Table 1.

(c) A third generated target word is "sensor", and a target sequence at this moment contains only "sensor" in the input words. Therefore, $c_2=[1;0;0]$. $C_{:2}=f(x,\overline{w},y_{:2})=[4;0;0]$ may be calculated by using formula (4), corresponding to values in the third column in Table 1.

(d) A fourth generated target word is "device", and a target sequence at this moment contains "sensor" and "device" in the input words. Therefore, $c_3=[1;1;0]C_{:3}=f(x,\overline{w},y_{:3})=[4;2;0]$ may be calculated by using formula (4), corresponding to values in the fourth column in Table 1.

(e) The rest may be deduced by analogy until an end identifier <EOS> is generated.

TABLE 1

| Process of generating C during the construction of the DCGN | | | | | | | | | |
|---|---|---|---|---|---|---|---|---|---|
| Keyword | Importance | <EOS> | a | sensor | device | . . . | sowing | • | <EOS> |
| sensor | 0.9 | 0 | 0 | 4 | 4 | . . . | 4 | 4 | |
| device | 0.7 | 0 | 0 | 0 | 2 | . . . | 2 | 2 | |

TABLE 1-continued

| | | | | Process of generating C during the construction of the DCGN | | | | |
|---|---|---|---|---|---|---|---|---|
| Keyword | Importance | \<EOS\> | a | sensor | device | . . . | sowing | • | \<EOS\> |
| sowing | 0.5 | 0 | 0 | 0 | 0 | . . . | 0 | | 0 |

$$\overline{w} = [4, 2, 0] \quad f(x, \overline{w}, y_0) \quad f(x, \overline{w}, y_1) \quad f(x, \overline{w}, y_2) \quad f(x, \overline{w}, y_3) \quad \ldots \quad f(x, \overline{w}, y_{11}) \quad f(x, \overline{w}, y_{12})$$

$1^{st}$ column $2^{nd}$ column $3^{rd}$ column $4^{th}$ column

S4: The importance constraint matrix is mapped by the importance constraint embedding layer to the distributed vector space to obtain the two input word importance embedding features.

In this step, two input word importance embedding features $$h_{:t}^{K}$$

and $$h_{:t}^{V}$$

at the moment t are calculated by using formulas (7) and (8).

S5: The generated sequence is obtained by the CA layer based on the feature of the hidden layer of the encoder, the feature of the hidden layer of the decoder, and the two input word importance embedding features.

In this step, a generated sequence $$y_{:t}^{o}$$

at the moment t is calculated by using formulas (9) and (10).

Over time, S2 to S5 are repeated. When t=T, the DCGN obtains a final generated text sequence $$y_{:T}^{o}.$$

For the given N samples $$\{x^{(n)}, y^{(n)}\}_{n=1}^{N}$$

in a training sample set, S1 to S5 are repeated to obtain generated sequences corresponding to the N samples.

S6: The loss function is constructed based on the generated sequence and the target sequence, and the network parameters are adjusted based on the loss function. S1 to S6 are repeated until the loss function meets a specified requirement to obtain the DCGN.

In this step, for the given N samples, the loss function of the DCGN is calculated by using formula (11). The network parameters are adjusted and optimized based on the loss function by using a conventional Adam optimization algorithm. Then, S1 to S6 are repeated until the loss function meets the specified requirement, for example, the loss function tends to be stable and basically unchanged, to complete the construction of the DCGN.

After sufficient training, the DCGN has capabilities of knowledge expression and reasoning and can adaptively extract, transfer, and reorganize cross-field design knowledge. In this stage, relevant design concept descriptions can be automatically generated by inputting well-defined design problems, valuable knowledge incentives, or the like into the trained DCGN. The DCGN combines the design knowledge from different fields such that a generated design concept contains input design information, and novelty and inventiveness of the generated design concept are ensured.

(II) Testing of the DCGN

The effectiveness and practicality of a proposed method for automatically generating a conceptual scheme are tested by inputting design problems (namely, keywords) as follows.

In the method for automatically generating a conceptual scheme provided in this embodiment, the constructed DCGN is used to perform the following steps:

L1: The feature of the hidden layer of the encoder is obtained by the Transformer encoder based on the input words.

In this step, the feature $h_e$ of the hidden layer of the encoder is calculated by using formula (1).

L2: A feature of the hidden layer of the decoder at a moment t is obtained by the Transformer decoder based on a generated sequence at a moment t−1.

In this step, the feature $$h_d^t$$

of the hidden layer of the decoder is calculated by using formula (12).

L3: The importance constraint matrix is obtained by the importance constraint matrix generation module based on the input words in the sample and the generated sequence at the moment t−1.

In this step, the importance constraint matrix $C_{:t-1}$ is calculated by using formula (13).

In this embodiment, the absolute importance of input words in the input sequence $y_{:t-1}$ of the decoder is set to be the same, and a value of $w_i$ is 1.

L4: The importance constraint matrix is mapped by the importance constraint embedding layer to the distributed vector space to obtain the two input word importance embedding features.

In this step, the two input word importance embedding features $$h_{:t}^{K}, h_{:t}^{V}$$

are obtained. The two input word importance embedding features $$h_{:t}^K, h_{:t}^V$$

at the moment t are calculated by using formulas (7) and (8).

L5: The generated sequence is obtained by the CA layer based on the feature of the hidden layer of the encoder, the feature of the hidden layer of the decoder, and the two input word importance embedding features.

In this step, a generated sequence at the moment t is calculated by using formulas (9) and (10).

L1 to L5 are repeated until a length of the generated sequence meets a specified requirement or the end identifier <EOS> is generated to obtain a final generated sequence, namely, the conceptual scheme.

Figure 3:
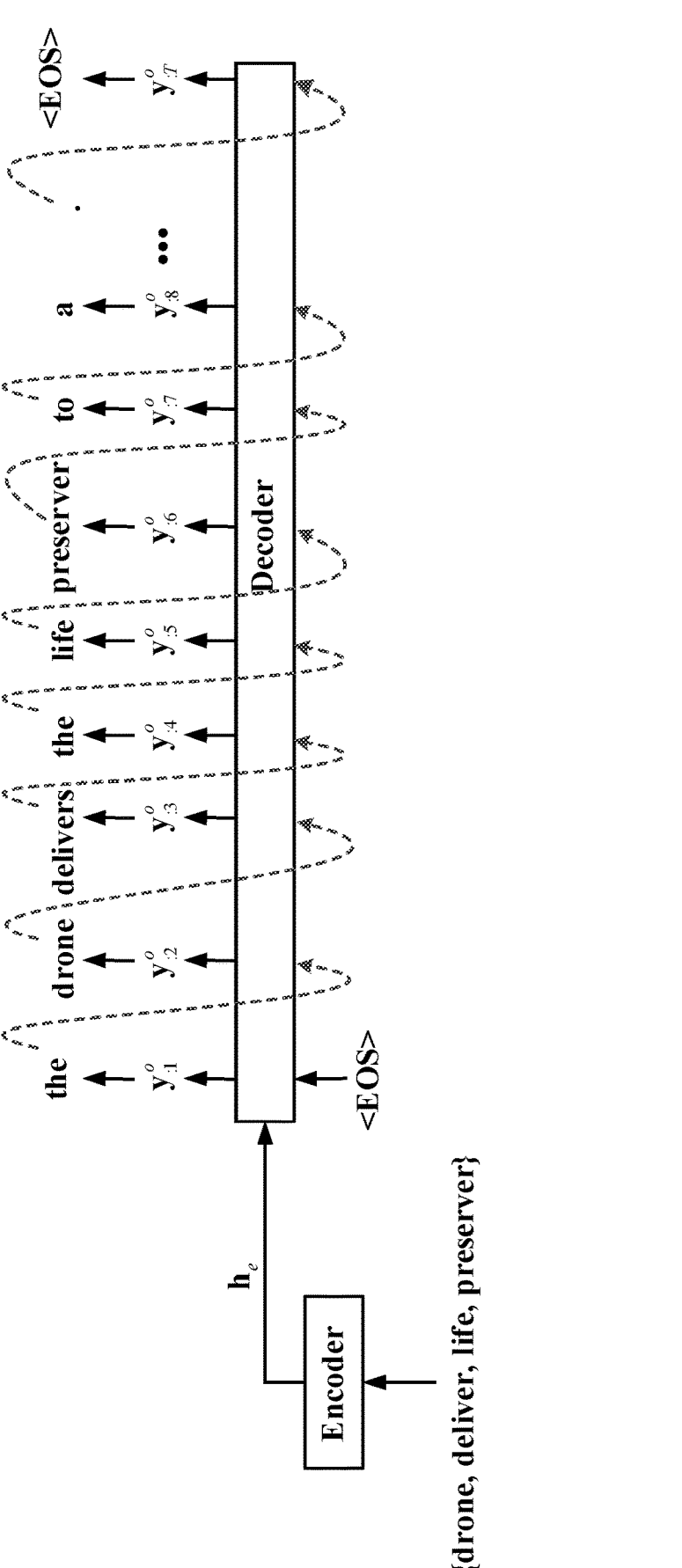
FIG. 3 is a schematic diagram of a conceptual scheme generation process according to an embodiment of the present disclosure.

Therefore, in the stage of generating the specific conceptual scheme, output words at the moment t−1 are used as a new part of the input at the moment t, and new words are generated in turn until the end identifier <EOS> is generated. The process is shown in FIG. 3. Let x={drone, deliver, life, preserver} be the input words, and the special character <EOS> represents the generated sequence $$y_0^?$$

at a start moment. L1 to L5 are repeated until the end identifier <EOS> is generated to obtain a generated sequence $$y_{:t}^?$$

={the drone delivers the life preserver to a . . . }.

In the generation stage, C is calculated based on a time step and an actual sequence generated at each moment, which is irrelevant to the target sequence. This is different from the training stage.

The following describes specific examples of generating conceptual schemes from different input word sources.

1. A design problem in this example is to provide drinkable water for residents in coastal areas. To express the design problem more accurately and concisely, 10 graduate students majoring in mechanical engineering are invited to define the design problem by using a limited number of keywords. Considering the advantages of sunshine and abundant light in the coastal areas, a design team agrees to use the keywords "purification" or "purify", "desalination" or "desalinate", "solar", "seawater", and "drink" to define the design problem. Combinations of different keywords are used as design input, and corresponding design concepts can be automatically generated based on the method for automatically generating a conceptual scheme through the constructed DCGN. Results are shown in Table 2. The automatically generated design concepts are more specific and feasible, such as inventing a system for purifying seawater into drinking water or using solar energy to desalinate seawater to produce canned drinking water or beverage products. These design concepts provide the residents in the coastal areas or enterprises with design ideas in an early stage of product development.

TABLE 2

Automatic generation of conceptual schemes with different design problem keywords as input

| Sequence number | Design problem keywords | Automatically generated conceptual schemes |
|---|---|---|
| 1 | purification seawater drink water | a) the present invention relates to a water purification system for purifying seawater, drink water, and/or distilled water. b) the present invention relates to a water purification system for purifying seawater, drink water, and other liquids. |
| 2 | desalinate seawater | a) the present invention relates to a method of desalinating seawater, and to an apparatus for preparing the same. b) the present invention relates to a method of desalinating seawater, and the use of the method. |
| 3 | purify seawater solar | a) a method to purify seawater using solar energy is provided. b) a method to purify seawater using solar energy is described. |
| 4 | purify seawater solar drink | a) solar power is used to purify seawater from a water source for use in preparing alcoholic beverages and drinks. b) solar power is used to purify seawater from a water source for use in preparing bottled water for drinking. |
| 5 | desalinate seawater solar drink | a) the seawater is desalinated by solar energy and is used to produce water for drinking. b) the seawater is desalinated using solar energy to produce a water drink. |

2. Design problems involved in the present disclosure may also be composed of design incentives. During product innovation concept design, design incentives provide rich and valuable design inspiration. In a conventional process of manually generating a conceptual scheme, design incentives for the conceptual scheme often rely on the rich experience and knowledge of a designer. In addition, the efficiency of generating the conceptual scheme is very low. The process becomes very difficult for inexperienced novice designers. Some obtained design incentives regarding a drone in this embodiment are shown in Table 3. Combinations of different design incentives are input to the DCGN to automatically generate conceptual schemes, as shown in Table 4. Due to a wide variety of combinations, only some valuable conceptual schemes are shown and analyzed herein. Examples:

(1) Design incentives "drone", "bio", "radar", and "rescue" are combined, and the DCGN automatically generates a design concept "a drone rescue radar system is disclosed that is capable of detecting the presence of an animal in the vicinity of the drone using bio".

(2) Design incentives "drone", "fire", "ground", and "data" are combined, and the DCGN automatically generates design concepts "the drone may also be configured to receive ground fire data from the ground drone and to determine a location of the fire in response to detecting the resulting fire" and "the drone may also be configured to receive ground fire data from the ground drone and to determine a location of the fire in response to determining the terrain".

TABLE 3

Design incentives retrieved in the drone example (in no particular order)

| Sequence number | Design incentive |
|---|---|
| 1 | drone |
| 2 | package_delivery |
| 3 | flying_time |
| 4 | wirelessly_charge |
| 5 | jointly_optimize_trajectory |
| 6 | unmanned_drone |
| 7 | fireground |
| 8 | evacuation_rescue |
| 9 | firefighting |
| 10 | fire_rescue |
| 11 | powerline_inspection |
| 12 | smoke_alarm |
| 13 | vegetation_encroachment |
| 14 | facade_cleaning |
| 15 | wall_climb |
| 16 | ultra-wideband_localization |
| 17 | intelligence_surveillance |
| 18 | military_reconnaissance |
| 19 | bio-radar |
| 20 | search_rescue |
| 21 | disaster_stricken |
| 22 | surveillance_search_rescue |
| 23 | rescue_mission |
| 24 | data_mule |

TABLE 4

Design concepts automatically generated by combining different design incentives in the drone example

| Sequence number | Design incentive combination | Automatically generated design concept |
|---|---|---|
| 1 | drone wirelessly charge | the drone includes a wireless charging module that is configured to charge the battery and to provide power to the uav. |
| 2 | drone jointly optimize trajectory | a) the drone may jointly optimize the trajectory of each of the plurality of drones based on the estimated trajectory. b) the drone may jointly optimize the trajectory of each of the plurality of drones based on the first trajectory. c) the drone may jointly optimize the trajectory of the vehicle based on the estimated trajectory. |
| 3 | drone evacuation rescue | a drone rescue and evacuation system and method of using the drone are provided. |
| 4 | drone firefighting | the present disclosure relates to a firefighting drone and to systems and methods for using the same in order to control fire fighting. |
| 5 | drone powerline inspection | apowerline inspection drone is provided that includes at least one control unit configured to control an inspection system of the drone. |
| 6 | drone vegetation encroachment | the drone may also include a vegetation encroachment detection system that detects the vegetation. |
| 7 | drone facade cleaning | a facade cleaning drone includes at least one cleaning unit configured to clean the facade of the drone. |
| 8 | drone wall climb | the drone climbs up and down the wall, thereby reducing the amount of time it takes to complete the climb. |
| 9 | drone wideband localization | a) a wideband localization drone is provided that is capable of detecting and transmitting data to and from the uav. b) a wideband localization drone is provided that is capable of detecting and transmitting data to and from one or more receivers. c) a wideband localization drone is provided that is capable of detecting and transmitting data to and from one or more remote locations. |

TABLE 4-continued

Design concepts automatically generated by combining
different design incentives in the drone example

| Sequence number | Design incentive combination | Automatically generated design concept |
|---|---|---|
| 10 | drone intelligent surveillance | an intelligent surveillance drone and a method for controlling the same are provided. |
| 11 | drone military reconnaissance | a) a military reconnaissance drone and method of deploying the same are provided.<br>b) a military reconnaissance drone and method of using the same are provided. |
| 12 | drone bio radar | a) the drone may also include a bio-sensing radar (bsr) module configured to detect the presence of the snr.<br>b) the drone may also include a bio-sensing radar (bsr) module configured to detect the presence of the sdr.<br>c) the drone may also include a bio-sensing radar (bsr) module configured to detect the presence of the smr. |
| 13 | drone search rescue | a search and rescue (srs) drone is provided that can be used to search for and locate objects in an area. |
| 14 | drone surveillance search rescue | a drone for search, rescue, surveillance, and/or surveillance is provided. |
| 15 | drone rescue mission | the drone may include a rescue mission controller configured to receive data associated with the mission. |
| 16 | drone fireground data | a) the drone may also include a fireground sensor configured to receive fire ground data and to generate fire surface data.<br>b) the drone may also include a fireground sensor configured to generate fire ground data.<br>c) the drone may also include a fireground sensor configured to receive fire ground data. |
| 17 | drone fire ground data | a) the drone may also be configured to receive ground fire data from the ground drone and to determine a location of the fire in response to detecting the resulting fire.<br>b) the drone may also be configured to receive ground fire data from the ground drone and to determine a location of the fire in response to determining the terrain. |
| 18 | drone fireground smoke alarm | afireground smoke alarm system for use with drones is disclosed herein for detecting fires. |
| 19 | drone bio radar rescue | a drone rescue radar system is disclosed that is capable of detecting the presence of an animal in the vicinity of the drone using bio. |

3. To fully supplement the design problems involved, some design problems may be defined based on design requirements. In an early stage of product design, the design requirements are critical to determining a design direction of a new product. Online product review data provides accurate, reliable, and truthful information for analyzing the design requirements and is easy to access. Text of 20918 user comments of a bottle sterilization cabinet is extracted from an e-commerce platform through a conventional crawler technology. Keywords and corresponding word frequencies are analyzed through data preprocessing described above. Results are shown in Table 5. It is found through analysis that users mainly expressed clear requirements in terms of function, disinfection, capacity, temperature, and the like. To apply the design requirements to obtain the design problems, the keywords "disinfection" or "sterilization", "temperature", "function", and "capacity" are used as the design problems of the DCGN. Automatically generated conceptual schemes are shown in Table 6. It is easy to learn that different conceptual schemes are generated with different combinations of input keywords. More importantly, all automatically generated conceptual schemes contain the input design problem keywords, and some feasible and creative conceptual schemes are generated, such as using an ion exchanger to improve sterilization and disinfection capabilities. The design requirements are met to some extent.

TABLE 5

Top 30 requirement keywords with high frequencies
in the online user review data

| Sequence number | User requirement | Frequency |
|---|---|---|
| 1 | Convenience | 6753 |
| 2 | Function | 5707 |
| 3 | Disinfection or sterilization | 4485 |
| 4 | Baby | 3506 |
| 5 | Capacity | 3145 |
| 6 | Appearance | 2918 |
| 7 | Milk bottle | 2577 |
| 8 | Operation | 2504 |
| 9 | Simple | 2284 |
| 10 | Temperature | 2252 |
| 11 | Constant temperature | 2207 |
| 12 | Use | 2033 |
| 13 | Shape | 1990 |
| 14 | Size | 1965 |
| 15 | Milk powder | 1937 |
| 16 | Drying | 1741 |

TABLE 5-continued

Top 30 requirement keywords with high frequencies
in the online user review data

| Sequence number | User requirement | Frequency |
|---|---|---|
| 17 | Jingdong | 1454 |
| 18 | Practicality | 1413 |
| 19 | Fast | 1375 |
| 20 | Quality | 1356 |
| 21 | Kettle | 1254 |
| 22 | Purchase | 1148 |
| 23 | Child | 1142 |
| 24 | White bear | 1120 |
| 25 | Logistics | 999 |
| 26 | Home | 994 |
| 27 | Time | 940 |
| 28 | Little bear | 929 |
| 29 | Heat preservation | 913 |
| 30 | Satisfied | 889 |

TABLE 6

Automatic generation of design concepts with different
design requirement keywords as input

| Sequence number | Design requirement keywords | Automatically generated design concept |
|---|---|---|
| 1 | sterilization function capacity | the present invention relates to a method and apparatus for sterilization, which is capable of enhancing the function, capacity, and/or performance of an ion exchanger. the present invention relates to a method and apparatus for sterilization, which is capable of enhancing the function, capacity, and/or effectiveness of the disinfection apparatus. |
| 2 | sterilization capacity temperature | the present invention relates to a sterilization apparatus capable of reducing the temperature, thereby increasing the sterilizing capacity, and improving the sterility of the product. the present invention relates to a sterilization apparatus capable of reducing the temperature, thereby increasing the sterilizing capacity, and improving the thermal stability of the device. |
| 3 | disinfection function capacity | the present invention relates to a disinfection apparatus capable of enhancing the function, capacity, and/or efficacy of an iodine disinfectant. the present invention relates to a disinfection apparatus capable of enhancing the function, capacity, and/or efficacy of an antimicrobial agent. |
| 4 | disinfection capacity temperature | thedisinfectioncapacity of the present invention can be improved by reducing the oxidation temperature. thedisinfectioncapacity of the present invention can be improved by adjusting the temperature. |
| 5 | disinfection function capacity temperature | thedisinfectioncapacity is a function of the temperature at which the vaporizer is heated and/or cooled. thedisinfectioncapacity is a function of the temperature at which the fluid is heated and the vaporization capacity. |
| 6 | sterilization function capacity temperature | afunction of the sterilizationtemperature is to determine if the sanitizer has the capacity to sterilize and/or not. afunction of the sterilizationtemperature is to determine if the sanitizer has the capacity to sterilize the product. |

In summary, if designers think about these design problems and rely only on human experience to produce conceptual schemes, it is difficult and inefficient to create innovative conceptual schemes. In view of the problem that it is difficult to transfer and reorganize cross-field design knowledge and automatically generate design conceptual schemes during the generation of product conceptual schemes, the present disclosure provides the method for automatically generating a conceptual scheme through a DCGN. The DCGN can adaptively learn reasoning, transfer, reorganization, and other potential rules of the cross-field design knowledge from massive text data and automatically generate the product conceptual schemes based on the design problems. The burden of manually generating conceptual schemes is reduced, design efficiency is improved, and new ideas are provided for intelligent conceptual design.

What is claimed is:

1. A method for constructing a design concept generation network (DCGN), wherein the DCGN comprises a Transformer encoder, a Transformer decoder, an importance constraint matrix generation module, an importance constraint embedding layer, a cross-attention (CA) layer, and an optimization module; and the method comprises the following steps:

S1: obtaining, by the Transformer encoder, a feature of a hidden layer of the Transformer encoder based on input words in a sample;

S2: obtaining, by the Transformer decoder, a feature of a hidden layer of the Transformer decoder based on a target sequence in the sample;

S3: obtaining, by the importance constraint matrix generation module, an importance constraint matrix based on the input words and the target sequence in the sample;

S4: mapping, by the importance constraint embedding layer, the importance constraint matrix to a distributed vector space to obtain two input word importance embedding features;

S5: obtaining, by the CA layer, a generated sequence based on the feature of the hidden layer of the Transformer encoder, the feature of the hidden layer of the Transformer decoder, and the two input word importance embedding features; and S6: constructing a loss function based on the generated sequence and the target sequence, and adjusting, by the optimization module, network parameters based on the loss function; and repeating S1 to S6 until the loss function meets a specified requirement to obtain the DCGN;

wherein in S2, the Transformer decoder maps a target sequence $y_{t-1}=[y_0,y_1,\ldots,y_{t-1}]$ at a moment t−1 to a distributed feature representation through a self-attention layer to obtain the feature $$h_d^t$$

of the hidden layer of the Transformer decoder:

$$h_d^t = SA(W_d^K y_{:t-1}, W_d^V y_{:t-1}, W_d^Q y_{:t-1}),$$

wherein SA( ) represents a spatial attention; and $$W_d^K, W_d^V, \text{and } W_d^Q$$

represent weight matrices of the self-attention layer of the Transformer decoder;

wherein in S3, $f(x,\overline{w},y_{:t})$ represents an input word importance constraint vector $C_{:t}$ contained in the target sequence $y_{:t}$;

$f(x,\overline{w},y_{:t})$ is calculated as follows:

$$f(x,\overline{w},y_{:t})=\overline{w} \cdot c_t,$$

wherein ·• represents a dot product operation of a vector or a matrix; and $\overline{w}=[\overline{w}_1,\overline{w}_2,\ldots,\overline{w}_i,\ldots,\overline{w}_m]\in \mathfrak{R}^m$ represents a relative importance vector of the input words x in the target sequence $y_{:t}$ and is calculated as follows:

$$\overline{w}_i = \left[\frac{w_i - w_{min}}{w_{max} - w_{min}} \times (M-1)\right], \forall i \in \{1, 2, \ldots, m\},$$

wherein $\overline{w}_i$ represents a relative importance of an $i^{th}$ input word in the target sequence $y_{:t}$; $w_i$ represents an absolute importance of the $i^{th}$ input word in the target sequence $y_{:t}$; $w_{min}$ represents a minimum absolute importance of the input word in the target sequence $y_{:t}$; $w_{max}$ represents a maximum absolute importance of the input word in the target sequence $y_{:t}$; [ ] represents a rounding operation; and M≥m>1 and M represents a maximum number of input words contained in samples in an entire training sample set; and $c_t \in \mathfrak{R}^m$ represents an input word constraint contained in the target sequence $y_{:t}$; when the target sequence $y_{:t}$ contains the $i^{th}$ input word, an $i^{th}$ element in the vector $c_t$ is 1, and the vector is calculated as follows:

$$c_t = (c_t^i)_{i=1}^m = \begin{cases} c_t^i = 0, \text{ if } x_i \subset y_{:t} \\ c_t^i = 1, \text{ if } x_i \not\subset y_{:t} \end{cases}.$$

2. The method according to claim 1, wherein in S1, the Transformer encoder obtains the feature $h_e$ of the hidden layer of the Transformer encoder by using the following formula:

$$h_e = SA(W_e^K x, W_e^V x, W_e^Q x),\tag{1}$$

wherein x represents the input words; SA( ) represents the spatial attention; and $$W_e^K, W_e^V, \text{and } W_e^Q$$

represent the weight matrices of a self-attention layer of the Transformer encoder.

3. The method according to claim 1, wherein in S4, two importance constraint embedding matrices $$W_c^K$$

and $$W_c^V$$

are introduced, and the importance constraint matrix is mapped to the distributed vector space to obtain the two input word importance embedding features $$h_{:t}^K$$

and $$h_{:t}^V,$$

wherein $$h_{:t}^K$$

and $$h_{:t}^V$$

are as follows at a moment t during generation:

$$h_{:t}^K = W_c^K(C_{:t-1}) = W_c^K[f(x,\overline{w}, y_{:t-1})]\tag{7}$$

$$h_{:t}^V = W_c^V(C_{:t-1}) = W_c^V[f(x,\overline{w}, y_{:t-1})].\tag{8}$$

25

26

4. The method according to claim 3, wherein in S5, the CA layer fuses the feature $h_e$ of the hidden layer of the Transformer encoder, the feature $$h_d^t$$

of the hidden layer of the Transformer decoder, and the two input word importance embedding features $$h_{:,t}^K, h_{:,t}^V$$

to obtain a generated sequence $$y_{:,t}^o$$

at the moment t:

$$y_{:,t}^o = CA\left(W_d^K h_e, W_d^V h_e, h_{:,t}^K, h_{:,t}^V, W_d^Q h_d^t\right), \quad (9)$$

wherein $$W_d^K, W_d^V, W_d^Q$$

represent weight matrices of a self-attention layer of the Transformer decoder;

a $j^{th}$ element in a CA function is expressed as follows:

$$CA\left(q, k, h^k, h^v, v\right)_j = \sum_{i=0}^{M-1} \alpha_{ij}\left(v_i + h_{ij}^v\right), \quad (10)$$

wherein $$q = W_d^K h_e; \ k = W_d^V h_e; \ v = W_d^Q h_d'; \ \alpha_{ij} = \text{soft max}(e_{ij}) = \frac{\exp(e_{ij})}{\sum\limits_{l=0}^{d-1} \exp(e_{il})};$$

$$e_{ij} = \frac{q_j\left(k_i + h_{ij}^k\right)^T}{\sqrt{d}}; \ i = 0, 1, \dots, M-1; \ j \text{ and } l = 0, 1, \dots, d-1; \ \text{and } ()^T$$

represents a transpose operation.

5. The method according to claim 1, wherein in S6, for given N samples $$\{x^{(n)}, y^{(n)}\}_{n=1}^N,$$

the loss function constructed based on the generated sequence and the samples target sequence is as follows:

$$\text{Loss}_{DCGN} = \frac{1}{TN} \sum_{n=1}^{N} \sum_{t=1}^{T} \text{err}(y_{:,t}^o, y_{:,t}), \quad (11)$$

wherein $$\text{err}(y_{:,t}^o, y_{:,t})$$

represents an error between a generated sequence $$y_{:,t}^o$$

and a target sequence $y_{:,t}$ at a moment t, and wherein T represents a length of the target sequence in the sample.

6. A method for automatically generating a conceptual scheme, performed by the DCGN constructed by using the method according to claim 1 and comprising the following steps:

L1: obtaining, by the Transformer encoder, the feature of the hidden layer of the Transformer encoder based on the input words;

L2: obtaining, by the Transformer decoder, the feature of the hidden layer of the Transformer decoder at a moment t based on the generated sequence at a moment t−1;

L3: obtaining, by the importance constraint matrix generation module, the importance constraint matrix based on the input words in the sample and the generated sequence at the moment t−1;

L4: mapping, by the importance constraint embedding layer, the importance constraint matrix to the distributed vector space to obtain the two input word importance embedding features; and L5: obtaining, by the CA layer, the generated sequence based on the feature of the hidden layer of the Transformer encoder, the feature of the hidden layer of the Transformer decoder, and the two input word importance embedding features.

7. The method for automatically generating the conceptual scheme according to claim 6, wherein in L1, the input words are keywords constructed based on a design problem, at least one design incentive, keywords constructed based on design requirements, or a combination of at least two of input word sources.

8. The method for automatically generating the conceptual scheme according to claim 7, wherein in L2, the feature $$h_d^t$$

of the hidden layer of the Transformer decoder at the moment t is calculated based on the generated sequence at the moment t−1 by using the following formula:

$$h_d^t = SA\left(W_d^K y_{:,t-1}, W_d^V y_{:,t-1}, W_d^Q y_{:,t-1}\right), \quad (12)$$

wherein $y_{:t-1}$ represents an input sequence of the Transformer decoder at the moment t during generation, $$y_{:t-1} = [y_0^o, y_{:t-1}^o], y_0^o$$

represents a given sequence at a start moment, and $$y_{:t-1}^o$$

represents the generated sequence at the moment t−1.

9. The method for automatically generating the conceptual scheme according to claim 6, wherein in L2, the feature $$h_d^t$$

of the hidden layer of the Transformer decoder at the moment t is calculated based on the generated sequence at the moment t−1 by using the following formula:

$$h_d^t = SA(W_d^K y_{:t-1}, W_d^V y_{:t-1}, W_d^Q y_{:t-1}), \qquad (12)$$

wherein $y_{:t-1}$ represents an input sequence of the Transformer decoder at the moment t during generation, $$y_{:t-1} = [y_0^o, y_{:t-1}^o], y_0^o$$

represents a given sequence at a start moment, and $$y_{:t-1}^o$$

represents the generated sequence at the moment t−1.

10. The method according to claim 1, wherein in S4, two importance constraint embedding matrices and $$W_c^K$$

and $$W_c^V$$

are introduced, and the importance constraint matrix is mapped to the distributed vector space to obtain the two input word importance embedding features $$h_{:t}^K$$

and $$h_{:t}^V,$$

wherein $$h_{:t}^K$$

and $$h_{:t}^V$$

are as follows at a moment t during generation:

$$h_{:t}^K = W_c^K(C_{:t-1}) = W_c^K[f(x, \overline{w}, y_{:t-1})] \qquad [[7]]$$

$$h_{:t}^V = W_c^V(C_{:t-1}) = W_c^V[f(x, \overline{w}, y_{:t-1})]. \qquad [[8]]$$

11. The method for automatically generating the conceptual scheme according to claim 6, wherein in S1 of the method for constructing the DCGN, the Transformer encoder obtains the feature $h_e$ of the hidden layer of the Transformer encoder by using the following formula:

$$h_e = SA(W_e^K x, W_e^V x, W_e^Q x), \qquad [[(1)]]$$

wherein x represents the input words; SA( ) represents the spatial attention; and $$W_e^K, W_e^V, \text{ and } W_e^Q$$

represent the weight matrices of a self-attention layer of the Transformer encoder.

12. The method for automatically generating the conceptual scheme according to claim 6, wherein in S4 of the method for constructing the DCGN, two importance constraint embedding matrices $$W_c^K$$

and $$W_c^V$$

are introduced, and the importance constraint matrix is mapped to the distributed vector space to obtain the two input word importance embedding features $$h_{:t}^K$$

US 12,626,101 B2

29 and $$h_{:t}^V,$$

wherein $$h_{:t}^K$$

and $$h_{:t}^V$$

are as follows at the moment t during generation:

$$h_{:t}^K = W_c^K(C_{:t-1}) = W_c^K[f(x, \overline{w}, y_{:t-1})] \qquad [[7]]$$

$$h_{:t}^V = W_c^V(C_{:t-1}) = W_c^V[f(x, \overline{w}, y_{:t-1})]. \qquad [[8]]$$

13. The method for automatically generating the conceptual scheme according to claim 12, wherein in S5 of the method for constructing the DCGN, the CA layer fuses the feature $h_e$ of the hidden layer of the Transformer encoder, $$h_d^t$$

of the hidden layer of the Transformer decoder, and the two input word importance embedding features $$h_{:t}^K, h_{:t}^V$$

to obtain a generated sequenc $$y_{:t}^o$$

at the moment t:

$$y_{:t}^o = CA(W_d^k h_e, W_d^V h_e, h_{:t}^K, h_{:t}^V, W_d^Q h_d^t), \qquad (9)$$

wherein $$W_d^K, W_d^V, W_d^Q$$

30 represent weight matrices of a self-attention layer of the Transformer decoder;

a $j^{th}$ element in a CA function is expressed as follows:

$$CA(q, k, h^k, h^v, v)_j = \sum_{i=0}^{M-1} \alpha_{ij}(v_i + h_{ij}^v), \qquad (10)$$

wherein $$q = W_d^K h_e; k = W_d^K h_e; v = W_d^Q h_d^t; \alpha_{ij} = \text{soft max}(e_{ij}) = \frac{\exp(e_{ij})}{\sum_{l=0}^{d-1} \exp(e_{il})};$$

$$e_{ij} = \frac{q_j(k_i + h_{ij}^k)^T}{\sqrt{d}}; i = 0, 1, \ldots, M-1; j \text{ and } l = 0, 1, \ldots, d-1; \text{ and } ()^T$$

represents a transpose operation.

14. The method for automatically generating the conceptual scheme according to claim 6, wherein in S6 of the method for constructing the DCGN, for given N samples $$\{x^{(n)}, y^{(n)}\}_{n=1}^N,$$

the loss function constructed based on the generated sequence and the target sequence is as follows:

$$\text{Loss}_{DCGN} = \frac{1}{TN} \sum_{n=1}^N \sum_{t=1}^T \text{err}(y_{:t}^o, y_{:t}), \qquad (11)$$

wherein $$\text{err}(y_{:t}^o, y_{:t})$$

represents an error between a generated sequence $$y_{:t}^o$$

and a target sequence $y_{:t}$ at the moment t, and wherein T represents a length of the target sequence in the sample.

* * * * *